United States Patent [19]
Sinfelt et al.

[11] 3,871,997
[45] Mar. 18, 1975

[54] NOVEL HYDROCARBON CONVERSION CATALYST AND REFORMING USE THEREOF

[75] Inventors: John H. Sinfelt, Berkeley Heights; Allan E. Barnett, Westfield; James L. Carter, Chatham, all of N.J.

[73] Assignee: Exxon Research & Engineering Company, Linden, N.J.

[22] Filed: July 19, 1973

[21] Appl. No.: 380,833

[52] U.S. Cl.............. 208/139, 208/138, 252/441, 252/466 PT
[51] Int. Cl..... C10g 35/08, B01j 11/78, B01j 11/08
[58] Field of Search............ 208/139, 138; 252/441, 252/466 PT

[56] References Cited
UNITED STATES PATENTS

| | | | |
|---|---|---|---|
| 2,848,377 | 8/1958 | Webb | 208/139 |
| 2,992,985 | 7/1961 | Doumani et al. | 208/139 |
| 3,109,038 | 10/1963 | Myers | 208/139 |
| 3,410,789 | 11/1968 | Rausch | 208/139 |

Primary Examiner—Delbert E. Gantz
Assistant Examiner—James W. Hellwege
Attorney, Agent, or Firm—Robert J. Baran

[57] ABSTRACT

The instant invention relates to a novel hydrocarbon conversion catalyst and its uses in hydrocarbon conversion processes. The novel catalyst of the instant invention comprises platinum, iridium and rhodium on an inorganic support. Preferably, the catalyst comprises from 0.1 to 1.0 wt. % platinum, from 0.1 to 1.0 wt. % iridium, and from 0.05 to 0.5 wt. % rhodium present on the surface of the support in the form of highly dispersed polymetallic clusters. The catalyst of this invention is especially useful in reforming of naphtha.

7 Claims, 2 Drawing Figures

3,871,997

NOVEL HYDROCARBON CONVERSION CATALYST AND REFORMING USE THEREOF

BACKGROUND OF THE INVENTION

1. Field of the Invention

The instant invention relates to a novel hydrocarbon conversion catalyst and its uses in hydrocarbon conversion processes. The novel catalyst of the instant invention comprises platinum, iridium and rhodium on an inorganic support. Preferably, the catalyst comprises from 0.1 to 1.0 wt. % platinum, from 0.1 to 1.0 wt. % iridium, and from 0.05 to 0.5 wt. % rhodium present on the surface of the support in the form of highly dispersed polymetallic clusters. The catalyst of this invention is especially useful in reforming of naphtha.

2. Description of the Prior Art

Platinum-iridium bimetallic reforming catalysts are known in the art; for example, see Webb et al., U.S. Pat. No. 2,848,377, which discloses that a platinum-iridium metal combination support on alumina is an effective hydrocarbon conversion catalyst. See also Sinfelt et al., U.S. Patent Application Ser. No. 194,461, which teaches that a more effective platinum-iridium catalyst may be prepared by carefully controlling the preparation conditions, i.e., by avoiding exposure of the catalyst to air or oxygen at temperatures above about 800°F.

While Pt-Ir reforming catalysts, when prepared according to the method of Sinfelt et al, have been commercially successful, the limited availability of iridium has necessitated further research to discover means for reducing the iridium content of Pt-Ir reforming catalysts. Rhodium has been suggested for use as a reforming catalyst metal. See, for example, Myers et al., U.S. Pat. No. 2,911,357, which teaches that a platinum, palladium, or rhodium-based reforming catalyst can be stabilized by the inclusion of a second metal component to inhibit crystal growth. However, it is clear that this reference nowhere teaches, shows or suggests a trimetallic reforming catalyst, and clearly does not teach that rhodium could be substituted for iridium.

Other patents which disclose the use of a rhodium catalyst in non-naphtha reforming processes include U.S. Pat. No. 3,481,722, wherein a rhodium or a platinum-rhodium catalyst on silica-alumina is utilized; and U.S. Pat. No. 3,585,253, wherein a catalyst for paraffin dehydrogenation comprising platinum, rhodium, and copper on alumina is disclosed. U.S. Pat. No. 3,595,932 teaches the use of platinum-rhodium on alumina as a catalyst for the steam dealkylation of alkyl benzenes. None of these references teaches, shows, or suggests a trimetallic catalyst comprising platinum, iridium, and rhodium on an inorganic oxide support for use in reforming of naphtha.

SUMMARY OF THE INVENTION

It now has been unexpectedly discovered that a novel catalyst for the reforming of naphtha results from the combination of platinum, iridium and rhodium on an inorganic oxide support. The catalyst for the instant invention, when utilized in reforming naphtha, shows unexpected advantages over the prior art bimetallic reforming catalysts.

Figure 1:
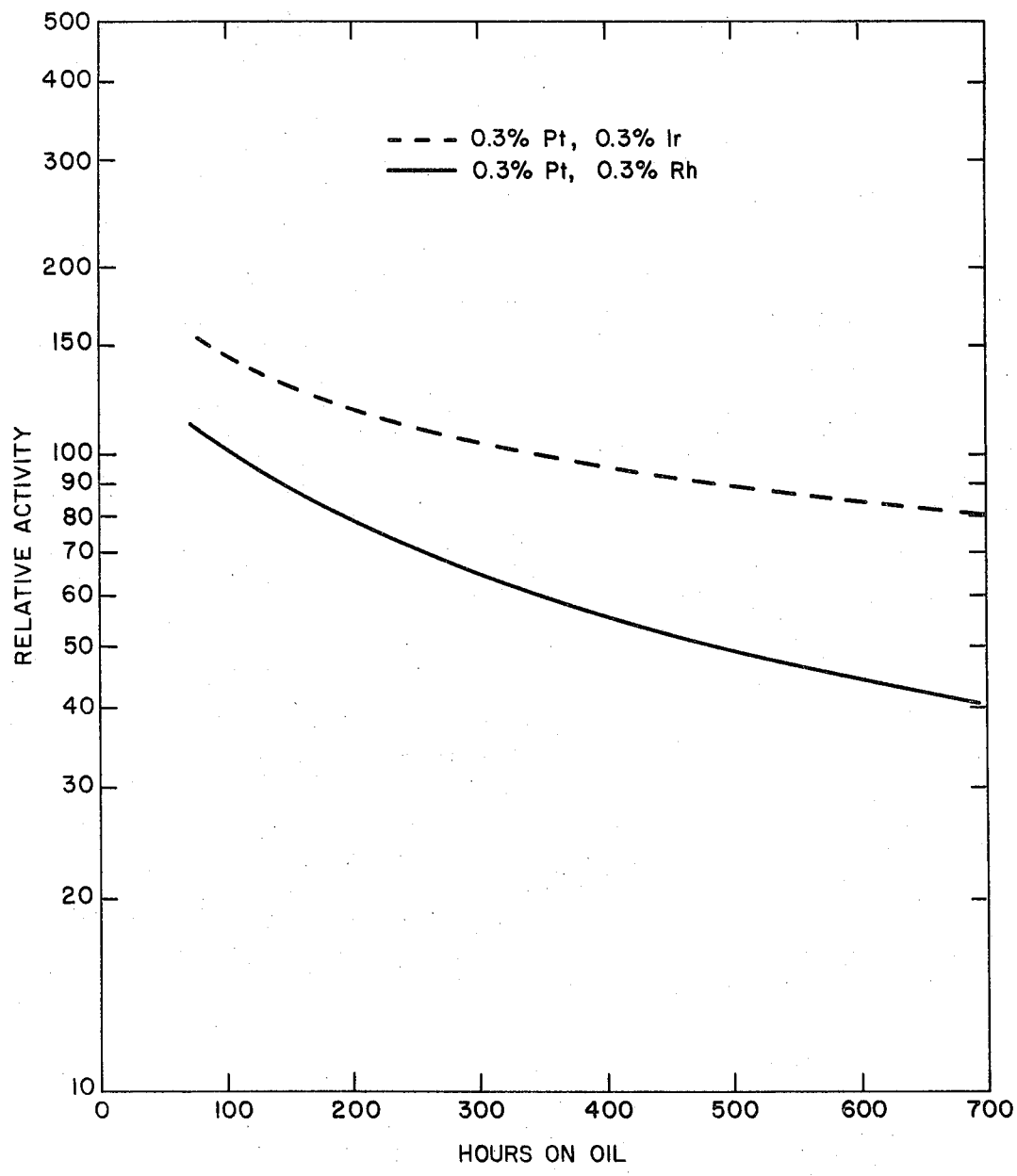
In FIG. 1, catalytic activities as a function of time on stream to give a $C_5+$ reformate with a research clear octane number of 100 are shown for two catalysts, one comprising platinum and iridium and the other platinum and rhodium, each containing 0.3 wt. % platinum and 0.3 wt. % of either iridium or rhodium on an alumina support.

The catalyst compositions of the present invention comprise platinum, iridium, and rhodium in a highly dispersed metallic state on a refractory support. The catalysts will comprise at least 0.05 wt. % rhodium, at least 0.1 wt. % platinum, and at least 0.1 wt. % iridium based on total catalyst weight. Preferably, the catalyst compositions of the instant invention will comprise from 0.1 to 1.0 wt. % platinum, from 0.1 to 1.0 wt. % iridium, and from 0.05 to 0.5 wt. % rhodium. The total metal surface area of the catalyst is at least 200 square meters per gram of said total metal, as determined by the carbon monoxide chemisorption method described by Sinfelt and Yates, J. Catalysis, 8, 82–90 (1967). Maximum reforming catalyst performance is obtained when the catalyst contains less than about two atoms of sulfur, preferably less than about one atom of sulfur, per atom of active Group VIII metal. (For the purpose of the instant invention, active Group VIII metal will refer to platinum, iridium, and rhodium.) The catalyst support is preferably substantially free of alkali or alkaline earth metal compounds and, as further described below, will give most effective performance in naphtha reforming when prepared in a manner avoiding exposure of the catalyst to air or oxygen at temperatures above about 800°F. When the catalysts of the instant invention are prepared in this manner, highly dispersed mutlimetallic clusters are formed, which are preferred to the compositions prepared by the general techniques known in the art for preparing reforming catalysts, i.e., calcination in oxygen.

The catalyst of the instant invention may be prepared conveniently by the techniques disclosed in U.S. Ser. No. 194,461 herein incorporated by reference. It is noted that the catalyst taught in U.S. Ser. No. 194,461 may be considered similar to the catalyst of the instant invention in that said catalysts both comprise iridium as a portion of the active catalyst metal. However, the catalyst of the instant invention differs in that at least a portion of the iridium will be substituted by rhodium. The substitution of rhodium for iridium unexpectedly yields a catalyst which shows a substantially constant activity when the catalyst activity is plotted versus hours on stream for said catalyst, i.e., the activity maintenance is excellent. As will be further described herein, platinum in combination with rhodium alone shows a significantly lower initial activity, and said activity decreases markedly with time on stream. It is well known in the reforming arts that high initial activity is generally desirable. However, activity maintenance during use is even more significant. Thus, it was not obvious that rhodium could be partially substituted for iridium in a reforming catalyst which additionally comprised platinum to yield a high activity catalyst which would maintain said activity for long periods of use.

The catalyst of the instant invention is preferably prepared by co-impregnation of the support using a solution of the catalyst metal precursors. Co-impregnation is generally favored over sequential techniques to enhance the formation of trimetallic clusters. It should especially be noted that such cluster formation is desirable in preparing the instant trimetallic catalysts. Thus, the preparation of the catalysts of the instant invention comprises contacting a solution of soluble metallic precursors with the support at suitable impregnating conditions. The catalyst metal precursor solution is preferably aqueous, and precursor compounds may be selected from the group consisting of chloroplatinic acid, chloroiridic acid, rhodium trichloride, iridium tribromide,, ammonium chloroiridate, ammonium chloroplatinate, platinum amine salts, rhodium nitrate, etc. In general, any precursor salt which is water soluble may be used. The impregnated catalyst is then dried. During drying, it is important that the catalyst not be contacted with oxygen if the temperature of drying exceeds about 800°F. The catalyst may be dried by contacting with an inert gas or by applying a vacuum to said impregnated catalyst. The catalyst, when sufficiently dried, is contacted with a reducing atmosphere to reduce the metallic precursors to the desired metallic form. Preferably, the catalyst is reduced in hydrogen. The catalyst is then a dispersed polymetallic cluster. The metallic atoms which constitute the cluster will be separated by distances of from about 2.5 to 4 Angstroms, and the average distance between the polymetallic cluster centers is at least 10 times the average distance between the atoms within a cluster.

The support or carrier component of the catalysts of the present invention is preferably a porous, adsorptive material having a surface area, as determined by the Brunauer-Emmet-Teller (BET) method, of from about 20 to 800, preferably 100 to 300, square meters/gram. The support material should be substantially refractory at the temperature and pressure conditions utilized in any given hydrocarbon conversion process.

Refractory inorganic oxide materials such as alumina, silica and alumino-silicates are the preferred catalyst support materials. In general, superior results are obtained when alumina-containing compositions are employed. Alumina is the preferred reforming catalyst base material. The support materials mentioned above are known articles of commerce and can be prepared for use as catalyst constituents by many varied techniques. Typically, the support materials are used in the form of spheres, granules, powders, extrudates or pellets, etc. The precise size or shape of the support material used is dependent upon many engineering factors not within the purview of the instant invention.

The platinum, iridium, and rhodium exist as components of a ploymetallic cluster on the surface of the refractory support. Improved catalyst performance is obtained when the catalyst is prepared in the manner described above, which favors formation of dispersed multimetallic clusters rather than separate crystallites of the individual metals. As disclosed hereinabove, at least 0.05 wt. % rhodium, 0.1 wt. % platinum, and 0.1 wt. % iridium must be present. Total metal concentration of the catalyst should be from 0.25 to 2.5 wt. %. As is known to those familiar with the reforming art, the metals utilized in the instant catalyst are costly, and thus minimum amounts must be utilized as long as said minimum amount does not result in an economic debit during use in reforming. Thus, the catalyst of the instant invention will generally contain less than 1.0 wt. % total metal, preferably less than 0.75 wt. %.

As is taught in U.S. Ser. No. 194,461, iridium-containing catalysts must be treated carefully to obtain maximum surface area. Thus, it is critical to the instant invention that prior to reduction to the metal the iridium does not exist in the form of large crystallites of iridium oxide, since maximum iridium surface area will not be obtained on reduction of said large crystallites. Agglomerated iridium, however, can be redispersed by contacting with halogen-containing gases, e.g. chlorine, in a substantial absence of oxygen as disclosed in U.S. Ser. No. 343,304, herein incorporated by reference. The techniques which are disclosed in U.S. Ser. No. 343,304 may be conveniently used with the catalyst of the instant invention.

The performance of the catalyst system of the present invention is affected by the presence of sulfur or sulfur-containing materials arising from the feed stock or other sources. Accordingly, when the catalyst is employed for reforming hydrocarbons, the sulfur content of the catalyst should be maintained at a level less than about two atoms of sulfur, preferably less than one atom of sulfur, per atom of iridium and additional catalyst metals. The desired low catalyst sulfur levels are advantageously maintained during the predominant portion of any reforming cycle. Higher catalyst sulfur levels may be encountered during some portions of a naphtha reforming run such as during start-up or in the event of a process upset. Sulfur is at least partially removed form the catalyst by contacting the same with sulfur-free feed stock. Finally, the catalyst should be substantially free of alkali metal (Group IA) or alkaline earth metal (Group IIA) constituents (less than 0.1 wt. %), since the presence of basic components on the catalyst serves to inhibit certain reforming reactions.

Following the impregnation of the support with the catalyst metal precursors, the catalyst is dried at a temperature varying from about 220° to 250°F. The catalyst may simply be dried in air at the above stated temperatures or may be dried by treating the catalyst in a flowing stream of inert gas or hydrogen. The drying step may be followed by an additional calcination step at a temperature of about 500°-700°F. Care must be taken to avoid contacting the catalyst at temperatures in excess of about 700°-800°F with air or other gas of high oxygen concentration. Otherwise the iridium will be oxidized, with loss of surface area, to crystallites or iridium oxide, and the polymetallic cluster structure will not be obtained on reduction.

Additional materials may be added to the catalyst to promote various types of hydrocarbon conversion reactions. For example, the naphtha reforming activity of the catalyst is improved by the addition of a halogen moiety, particularly a chlorine or fluorine moiety, to the catalyst. The halogen is present in the catalyst in amounts varying from about 0.1 to about 3 wt. %, based on total dry weight of the catalyst. The halogens may be incorporated into the catalyst at any suitable stage in the catalyst manufacture, i.e., before, during, or after incorporation of the catalyst metals onto the support material. Halogen is often incorporated into the catalyst when impregnating the support with halogen-bearing metal catalyst components, such as chloroplatinic acid. Further amounts of halogen may be incorporated in the catalyst by contacting it with materials such as hydrogen fluoride, ammonium fluoride, hydrogen chloride, ammonium chloride, either prior to or subsequent to the metal impregnation step. Halogen may also be incorporated by contacting the catalyst with a gaseous stream containing the halogen, generally chlorine.

The catalyst compositions of the present invention have uses in processes other than reforming. For example, the catalysts can be employed in the formation of aromatic compounds by contacting the catalyst with suitable paraffins or naphthenes at a temperature varying between about 700° and 1,000°F and a pressure of less than about 10 atmospheres in the presence of hydrogen. The catalysts of this invention can also be employed to promote the isomerization of ethylbenzene to xylenes by contacting ethylbenzene with the catalyst at a temperature varying from about 400° to 1,100°F at elevated pressures in the presence of hydrogen. The catalysts are also useful for promoting hydrogenation, hydrocracking, oxidation, polymerization, condensation and other reactions known to the art. However, the catalysts are particularly useful in naphtha reforming processes.

In a naphtha hydroforming (reforming) process, a substantially sulfur-free naphtha stream that typically contains about 10–80 volume % paraffins, 10–80 volume % naphthenes, and about 2% to 20% aromatics, and boiling at atmospheric pressure substantially between about 80° and 450°F, preferably between about 150° and 375°F, is brought into contact with the catalyst system of the present invention in the presence of hydrogen. The reactions typically take place in the vapor phase at a temperature varying from about 650° to 1,000°F, preferably about 750° to 980°F. Reaction zone pressures may vary from about 1 to 50 atmospheres, preferably from about 5 to 25 atmospheres.

The naphtha feed stream is generally passed over the catalyst at space velocities varying from about 0.5 to 20 parts by weight of naphtha per hour per part by weight of catalyst (w/hr/w), preferably from about 1 to 10 w/hr/w. The hydrogen to hydrocarbon mole ratio within the reaction zone is maintained between about 0.5 and 20, preferably between about 1 and 10. During the reforming process, the hydrogen employed can be in admixture with light gaseous hydrocarbons. Since the hydroforming process produces large quantities of hydrogen, a recycle stream is employed for admission of hydrogen with the feed.

In a typical operation, the catalyst is maintained as a fixed bed within a series of adiabatically operated reactors. Specifically, the product stream from each reactor (except the last) in the reactor series is reheated prior to passage to the following reactor. As an alternate to the above-described process sequence, the catalyst may be employed in a moving bed in which the naphtha charge stock, hydrogen and catalyst are passed in parallel through the reactor, or in a fluidized system wherein the naphtha feed stock is passed upwardly through a turbulent bed of finely divided catalyst.

A naphtha reforming operation involves a plurality or reactions that occur simultaneously. Specifically, the naphthene portion of the naphtha stream is dehydrogenated to the corresponding aromatic compounds, the normal paraffins are isomerized to branched chain paraffins, and various aromatic compounds are isomerized to other aromatics. The high boiling components in the naphtha stream are also hydrocracked to lower boiling components. The platinum-iridium-rhodium catalyst of this invention has been found to be a particularly effective dehydrocyclization catalyst, that is, an effective catalyst for the coversion of paraffins to aromatics. Accordingly, the catalyst of the present invention, i.e., the platinum-iridium-rhodium catalyst, can be used very effectively in the final reactors of a reactor series to promote the conversion of paraffins to aromatics, after the naphthenes contained in the naphtha streams have been converted to aromatics with the use of a conventional reforming catalyst such as platinum on alumina.

An outstanding feature of the instant platinum-iridium-rhodium reforming catalyst is its ability to maintain its catalytic activity at commercially desirable levels for protracted periods of time. In a typical commercial semi-regenerative naphtha reforming process, reaction temperature is increased during the course of the run to maintain constant product octane level. Raising the reaction temperature is necessitated because the catalyst is continuously deactivated as coke is laid down on the catalyst. Unfortunately, the reaction temperature cannot be raised much beyond about 1,000°F before rapid catalyst deactivation commences. Therefore, as the reaction temperature approaches about 1,000°F, it is necessary to regenerate or replace the catalyst. Typically, a regeneration operation consists of burning the coke deposits from the catalyst and thereafter treating the catalyst with chlorine, HCl, organic chlorides or mixtures thereof in the presence or absence of oxygen or other materials, e.g., steam, nitrogen, hydrogen sulfide, flue gas, etc.

It is desirable to increase the duration of the periods between process start-up and catalyst regeneration and/or between catalyst regenerations since valuable production time is lost when the catalyst is being regenerated. As noted above, the present platinum-iridium-rhodium catalyst has unusual activity maintenance characteristics and, accordingly, needs to be regenerated very infrequently. The specific platinum-iridium-rhodium catalyst of this invention can be used to promote a semi-regenerative naphtha reforming operation conducted at conditions described above to obtain onstream cycle lengths corresponding to the processing of at least about 50 barrels (42 gallons of 231 cubic inches each per barrel measured at 60°F) of naphtha feed stock per pound of catalyst to form $C_5+$ reformate product having a research clear octane number of at least 100 without incurring a $C_5+$ reformate yield loss greater than about 3 volume % for the last 95% of the reforming cycle (period between start-up and catalyst regeneration), the cycle beginning with either a fresh or freshly regenerated catalyst. More typically, the catalyst can be used to process prior to regeneration up to 60 and frequently in excess of 75 barrels of feed stock per pound of catalyst to obtain a 100+ research clear octane number product without incurring a yield loss in excess of that mentioned above.

The invention may be more fully understood by the following examples illustrating the same.

EXAMPLE 1

A catalyst containing 0.3 wt. % platinum, 0.15 wt. % iridium, and 0.15 wt. % rhodium on alumina was prepared by coimpregnating 1/16 inch diameter alumina extrudates with an aqueous solution of chloroplatinic acid, chloroiridic acid, and rhodium trichloride. The solution contained 0.0052 g of chloroplatinic acid ($H_2PtCl_6 \cdot nH_2O$ containing 40 wt. % platinum), 0.0027 g of chloroiridic acid ($H_2IrCl_6 \cdot nH_2O$ containing 38.5 wt. % iridium), 0.0027 g of rhodium trichloride ($RhCl_3 \cdot nH_2O$ containing 39 wt % rhodium), and 0.0064 g of hydrogen chloride (HC1) per milliliter of solution. Approximately 1.45 milliliters of impregnating solution was used per gram of alumina. The alumina was kept in contact with the impregnating solution overnight, during which time the alumina sorbed the platinum, iridium, and rhodium-containing specied from solution. The depleted solution was then decanted from the alumina, and the latter was dried for about 3 days at 230°F. The dried material was then calcined in air at 500°F for 3 hours. The alumina used in the preparation was a gamma alumina with a surface area of approximately 180 $m^2/g$.

EXAMPLE 2

The catalyst of Example 1 was charged to a steel reactor with an inside diameter of approximately 1½ inch and a capacity of about 1,000 cubic centimeters. The reactor was immersed in a fluidized solids heating bath to control reactor temperature. An accelerated naphtha reforming run was conducted on this catalyst using a naphtha containing 47.3 vol % paraffins, 42.2 vol % naphthenes, and 10.5 vol % aromatics. Operating conditions were 915°F sand bath temperature, 200 psig, 2.1 weight hourly space velocity, and variable hydrogen-rich recycle gas rates as low as 500 standard cubic feet per barrel of naphtha. After 143 hours on stream, the catalyst contained approximately 22 wt. % coke. The coked catalyst was then regenerated with a gas containing 0.3% oxygen, 2,000 ppm $H_2O$, and 0.03% chlorine in nitrogen. The flame front temperature was maintained at approximately 910°F. The regeneration required a period of 34 hours to burn the coke off the catalyst.

EXAMPLE 3

Figure 2:
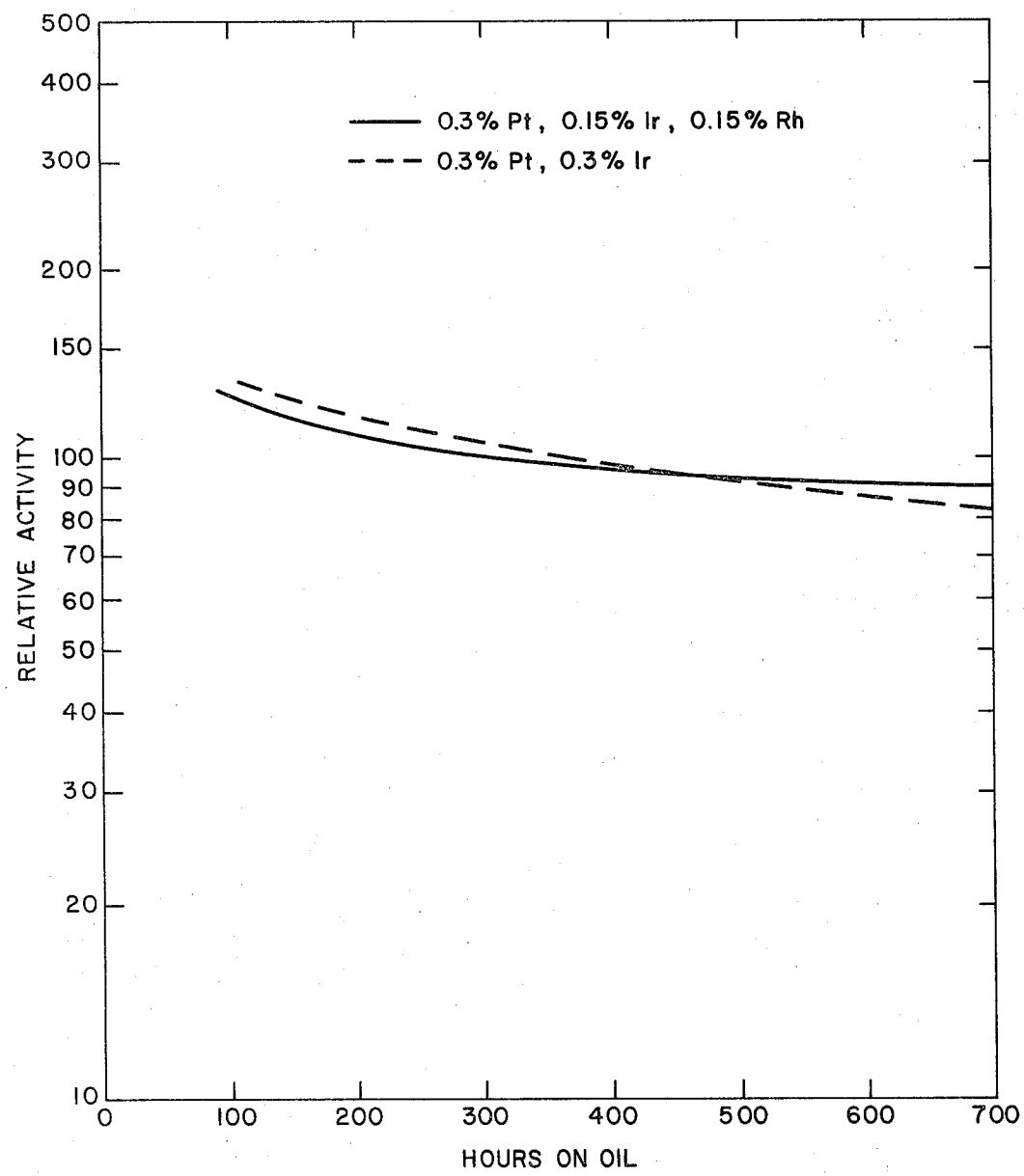
In FIG. 2, catalytic activities as a function of time on stream to give a $C_5+$ reformate with a research clear octane number of 100 are shown for two catalysts, a platinum-iridium-rhodium catalyst and a platinum-iridium catalyst, each containing 0.3 wt. % platinum. The trimetallic catalyst comprises an additional 0.15 wt. % iridium and 0.15 wt. % rhodium, while the bimetallic catalyst comprises an additional 0.3 wt % of iridium. Both of these catalysts are supported on alumina.

The regenerated catalyst of Example 2 was employed in a normal naphtha reforming run using the naphtha feed and apparatus of Example 2. Operating conditions were 916°F sand bath temperature, 200 psig, 2.1 weight hourly space velocity, and a hydrogen-rich recycle gas rate of 6,000 standard cubic feet per barrel of naphtha. The run was conducted to produce a $C_5+$ reformate product with a research clear octane number of 100. The catalyst was sulfided prior to startup with a hydrogen sulfide-hydrogen mixture. The amount of hydrogen sulfide contacted with the catalyst corresponded to 0.07 wt % sulfur on catalyst. A sulfur level of 0.5 ppm in the feed was maintained throughout the run. In FIG. 2, a plot of the relative catalyst activity (catalyst performance number CPN) is shown as a function of time on stream. Data for a regenerated 0.3% Pt, 0.3% Ir catalyst are shown for comparison. The activity-time data show equivalent performance of the two catalysts over a period of 750 hours. The $C_5+$ yields for the two catalysts also were found to be equivalent within 0.5 vol %. However, the catalyst containing rhodium gave a different distribution of $C_1$–$C_4$ products, about 2 wt. % lower yields of $C_1 + C_2$ and about 1.5 wt % higher yields of $C_3 + C_4$.

EXAMPLE 4

The naphtha feed of Example 2 was employed in another catalyst comparison using the conditions of Example 3. In this case, platinum-iridium and platinum-rhodium catalysts were compared. Both catalysts contained 0.3 wt % platinum. The platinum-iridium catalyst contained an additional 0.3 wt % iridium, while the platinum-rhodium catalyst contained an additional 0.3 wt % rhodium. Both catalysts were supported on alumina and contained 1.5 wt % chlorine based on dry catalyst. The performance of these two catalysts is shown in FIG. 1, as a function of time on stream. The activity-time data show that the platinum-rhodium catalyst has lower initial activity than the platinum-iridium catalyst, and the activity decreases at a substantially greater rate. This would lead the skilled artisan to believe that the substitution of rhodium for part of the iridium in a platinum-iridium catalyst would result in decreased initial activity and poorer activity maintenance during use. However, unexpectedly, the catalyst of the instant invention, which comprises platinum, iridium, and rhodium, shows activity which is at least as good as platinum-iridium alone, both initially and over a 700-hour period on stream. The utility of the instant invention is thus readily seen in that rhodium may be used as a partial substitute for iridium which, because of a limited supply of iridium, as disclosed above, further extends the use of platinum-iridium type catalysts. As has been already demonstrated in U.S. Ser. No. 194,461, platinum-iridium catalysts have been shown to yield substantially better results than the platinum and platinum-rhenium reforming catalysts known in the art. (See especially FIG. 2 and Example 11 of U.S. Ser. No. 194,461.)

What is claimed is:

1. A naphtha reforming catalyst comprising alumina in association with from 0.1 to 1.0 wt % platinum, from 0.1 to 1.0 wt % iridium, and from 0.05 to 0.5 wt % rhodium based on total catalyst, said platinum, iridium and rhodium being present as polymetallic clusters on said support, and said clusters having a surface area of at least 200 square meters per gram of metal as determined by carbon monoxide chemisorption techniques, said catalyst further comprising a halogen moiety in an amount of from 0.1 to 3 wt % based on total catalyst and containing less than about 2 atoms of sulfur per atom of metal and being substantially free of alkali and alkaline earth metal constituents.

2. The catalyst composition of claim 1 wherein said metals are present on said support in the form of dispersed polymetallic atom clusters, the metal atoms of said clusters being separated by distances varying from about 2.5 to 4.0 Angstroms, the average distance between the centers of said clusters present on said support being at least 10 times the average distance between the atoms in the clusters.

3. A hydrocarbon reforming process which comprises contacting a normally liquid hydrocarbon material at reforming conditions and in the presence of hydrogen with a catalyst comprising from 0.1 to 1.0 wt % platinum, from 0.1 to 1.0 wt % iridium and from 0.05 to 0.5 wt % rhodium based on total catalyst weight supported on a refractory inorganic oxide support, said platinum, iridium and rhodium being present as metals having a surface area of at least 200 square meters per gram as determined by carbon monoxide chemisorption techniques, said catalyst containing less than about 2 atoms of sulfur per atom of metal and being substantially free of alkali and alkaline earth metal constituents.

4. The process of claim 3 wherein said catalyst additionally contains from about 0.1 to 3 wt % of a halogen based on total catalyst.

5. The process of claim 4 wherein said halogen is chlorine.

6. The process of claim 5 wherein said normally liquid hydrocarbon material is contacted with said catalyst at a temperature varying from 650° to 1,000°F and at a pressure varying from 1 to 50 atmospheres.

7. The process of claim 6 wherein said support is alumina.

* * * * *